United States Patent [19]
Spangler et al.

[11] Patent Number: 5,495,414
[45] Date of Patent: Feb. 27, 1996

[54] INTEGRATED SILICON AUTOMOTIVE ACCELEROMETER AND SINGLE-POINT IMPACT SENSOR

[75] Inventors: Leland J. Spangler, Ann Arbor, Mich.; Christopher J. Kemp, Monument, Colo.; Michael C. Graf, Allen Park, Mich.

[73] Assignee: Ford Motor Company, Dearborn, Mich.

[21] Appl. No.: 43,680

[22] Filed: Apr. 7, 1993

[51] Int. Cl.⁶ .................................................. B60R 21/32
[52] U.S. Cl. .................. 364/424.05; 340/436; 307/10.1; 280/735; 180/282
[58] Field of Search .................. 364/424.05, 460, 364/461; 340/435, 436, 438, 903; 180/232, 271, 282; 280/728 R, 734, 735; 307/9.1, 10.1; 73/514, 517 B

[56] References Cited

U.S. PATENT DOCUMENTS

| | | | |
|---|---|---|---|
| 4,887,066 | 12/1989 | Marek | 340/436 |
| 4,984,464 | 1/1991 | Thomas et al. | 180/282 |
| 4,994,972 | 2/1991 | Diller | 364/424.05 |
| 5,034,891 | 7/1991 | Blackburn et al. | 364/424.05 |
| 5,036,467 | 7/1991 | Blackburn et al. | 364/424.05 |
| 5,065,322 | 11/1991 | Mazur et al. | 364/424.05 |
| 5,073,860 | 12/1991 | Blackburn et al. | 364/424.05 |
| 5,095,575 | 3/1992 | Suzuki et al. | 73/517 B |
| 5,107,245 | 4/1992 | Gesper et al. | 340/436 |
| 5,109,341 | 4/1992 | Blackburn et al. | 364/424.05 |
| 5,170,066 | 12/1992 | Huber | 307/10.1 |
| 5,173,614 | 12/1992 | Woehrl et al. | 307/10.1 |
| 5,189,311 | 2/1993 | Moriyama et al. | 364/424.05 |

FOREIGN PATENT DOCUMENTS

| | | |
|---|---|---|
| 0520352 | 6/1992 | European Pat. Off. . |
| 4209140 | 9/1992 | Germany . |
| WO8912830 | 12/1989 | WIPO . |

*Primary Examiner*—Gary Chin
*Attorney, Agent, or Firm*—Richard D. Dixon; Roger L. May

[57] ABSTRACT

A single-point impact sensor has a fully differential capacitive sense element for providing a capacitive difference which is proportional to the acceleration of the vehicle. The capacitive difference is converted into a digital pulse train signal which is pulse density modulated with variations in the capacitance. The pulse density of the pulse train is evaluated according to a hierarchy of counters and timers to determine if it is indicative of an activation worthy event. In one embodiment, a non-volatile programmable memory is provided to control the operation of the impact sensor.

7 Claims, 6 Drawing Sheets fig-2 fig-3 fig-4 fig-5 fig-6c fig-6d

000
INTEGRATED SILICON AUTOMOTIVE ACCELEROMETER AND SINGLE-POINT IMPACT SENSOR

TECHNICAL FIELD

This invention relates generally to impact sensors for use in the activation of a vehicle passenger restraint mechanism and, more particularly, to impact sensors which use accelerometers to detect the occurrence of a high impact condition in the vehicle.

BACKGROUND ART

Passive restraint systems such as airbags or automotive seat belt tensioners have experienced increased usage in vehicles to protect passengers during frontal collisions. These types of restraints require no extra action by the passenger to achieve protection. Rather, the passive restraint is automatically activated in the event of an activation worthy impact event.

Various types of impact sensors have been designed for determining if passive restraint, such as inflation of the airbag, is needed for a given impact event to ensure that the airbag is inflated only when airbag protection is necessary. Ideally, the impact sensor is able to discriminate between activation worthy events and non-activation worthy events.

One type of impact sensing system uses a plurality of threshold switches in the front region of the vehicle. These switches send an impact signal for inflating the airbag if a high impact event is severe enough to close the switches. Mechanical sensor-based systems of this type too often rely on sensor redundancy to minimize the negative effects of any sensor malfunction which may occur. This requires a large number of switches within each vehicle, increasing the overall complexity of the impact sensing system. Wire harnesses which require additional assembly must also be used in this type of system. Additionally, the threshold switches must be located in strategic places in the vehicle where they have the best opportunity to detect and discriminate between various types of impacts. Determining these locations requires extensive impact testing and studying of impact effects on the vehicle to determine the best placement for the threshold switch sensors.

Another type of impact sensing system uses single-point impact sensors instead of multiple switches. This type of sensor has an accelerometer located in the passenger compartment of the vehicle to constantly monitor the acceleration of the vehicle and sense any sudden deceleration of the vehicle. The output of the accelerometer is continuously analyzed to determine if and when deceleration occurs and if the deceleration is caused by a impact which is severe enough to require activation of the airbag or other passenger restraint. The impact sensing system must be sophisticated enough to prevent inadvertent activation of the safety devices and yet simple enough to test quickly and often to assure proper operation.

A single-point impact sensing system must also be able to quickly and efficiently evaluate the output from the accelerometer to determine whether a given impact requires activation of safety mechanisms. The output of the accelerometer must have characteristics which can be easily analyzed to discriminate between activation worthy and non-activation worthy events. The impact sensor must measure not only the magnitude of the deceleration but also its duration to provide the most accurate response.

Many types of single-point impact sensors use the frequency response of the accelerometer to determine whether a given impact requires activation of passenger restraints. One type of single-point impact sensor is described in U.S. Pat. No. 5,065,322 to Mazur et al. The signal from the accelerometer is sent through an analog-to-digital converter to convert it into a digitized time domain vibratory electric signal. A fast Fourier transform device then transforms the digitized signal into frequency domain signals. The amplitudes of the frequency domain signals are summed over the entire frequency spectrum and evaluated to determine whether there are frequency components which indicate the occurrences of a predetermined type of vehicle impact. The passenger restraint is actuated when the sum of the amplitudes of at least one selected frequency is greater than a predetermined threshold. This type of impact sensing method, as well as the circuitry to perform this method, is quite complex since the accelerometer signal must first be digitized and then converted into the frequency domain before any type of signal evaluation can take place. Transform devices and various filters for eliminating signals outside the desired frequency range must be used to analyze the acceleration signal, increasing the overall number of electrical devices in the impact sensor and decreasing its adaptability for integration onto a single chip.

An accelerometer which provides a digital output is described in U.S. Pat. No. 5,095,750 to Suzuki et al. The accelerometer has a movable electrode in between two fixed electrodes to form two variable capacitors. Acceleration forces displace the movable electrode, changing the size of the gaps in between the movable electrode and the fixed electrodes and consequently varying the two capacitances. A capacitance detector measures the gaps and generates an output voltage which represents the difference between the lengths of the gaps. A pulse width modulator generates an output signal which has a pulse width modulated according to the magnitude output voltage. The pulse width of this output signal is accurately proportional to the acceleration to be detected. This output signal, however, cannot be easily interpreted to determine the occurrence of a vehicular impact condition and therefore the accelerometer is not easily adaptable for use in a single-point impact sensor. Also, the response in this type of accelerometer is susceptible to temperature changes, requiring additional temperature compensation circuitry to offset the changes.

DISCLOSURE OF THE INVENTION

It is therefore an object of the present invention to provide a single-point impact sensor with an accelerometer with an output signal which can be easily evaluated for impact condition characteristics without extensive signal processing.

Another object of the present invention is to provide a impact sensor which requires a minimal number of components which can be integrated onto a single chip.

Yet another object of the present invention is to provide a impact sensor which requires no discrete filters or temperature compensation circuitry in its design.

Accordingly, an integrated silicon automotive accelerometer and impact sensor contains an acceleration sensitive sense element, a circuit for converting the sense element output into an electrical signal, and a deployment decision circuit for analyzing the electrical signal. All of the impact sensor components are integrated onto a single chip. In a preferred embodiment, a non-volatile programmable memory is also located on the chip. The memory is used to store vehicle-specific parameters for controlling the operation of the sensor.

The sense element is preferably a fully differential capacitive sense element. More specifically, the sense element preferably has a substantially planar dielectric substrate with at least two fixed conductive plates and a semiconductive pedestal attached to the substrate. A substantially planar semiconductive upper plate is positioned above and generally parallel to the substrate and has an internal opening surrounding a pedestal. A pair of oppositely directed torsion arms connect the upper plate to the pedestal and define a flexure axis which divides the upper plate into first and second movable portions. The upper plate is tiltable about the flexure axis in response to acceleration occurring normal to the sense element. Sensitivity of the sense element and the frequency response of the upper plate may be adjusted using a plurality of openings extending through the upper plate. The fixed conductive plates on the substrate and the first and second portions of the upper plate define first and second capacitors which vary in capacitance according to the amount of deflection in the upper plate. The variations in the difference between the two capacitances is indicative of variations in the amount of acceleration that the impact sensor is experiencing.

These variations in the sense element's capacitance difference are converted to variations in the pulse density of a digital pulse train. Pulse density is defined as the number of pulses which occur per unit time and, in the present invention, is proportional to the average acceleration over the unit time in an approximately linear fashion. A hierarchy of timers and counters in a deployment decision circuit monitor and evaluate the pulse density of the signal. By modulating the pulse count per unit time instead of the pulse width, monitoring and evaluating the pulse train is kept relatively simple since the circuitry only needs to measure the number of pulses in a given time and not their widths. The deployment decision circuit evaluates and interprets the pulse train by counting the number of pulses in a fixed amount of time at different time intervals. A flag is set each time the number of pulses exceeds a certain threshold. If the number of flags set within a selected time interval exceeds a predetermined limit, an activation signal is generated to actuate the passenger restraint.

A programmable memory on the chip is used to store a selected offset and gain of the pulse train and to store calibration values. The memory is also used to store vehicle specific deployment algorithm coefficients which are different for each type of vehicle. This enables the same impact sensor to be used in a variety of different vehicle models with modification of only the programmed values and not the entire sensor structure itself. An on-chip microprocessor interface is used to read and write from memory. Preferably, all of the components in the impact sensor are placed in a conventional integrated circuit package to facilitate sensor assembly and automated board placement.

The above objects and other objects, features, and advantages of the present invention are readily apparent from the following detailed description of the best mode for carrying out the invention when taken in connection with the accompanying drawings.

BEST MODES(S) FOR CARRYING OUT THE INVENTION

Figure 1:
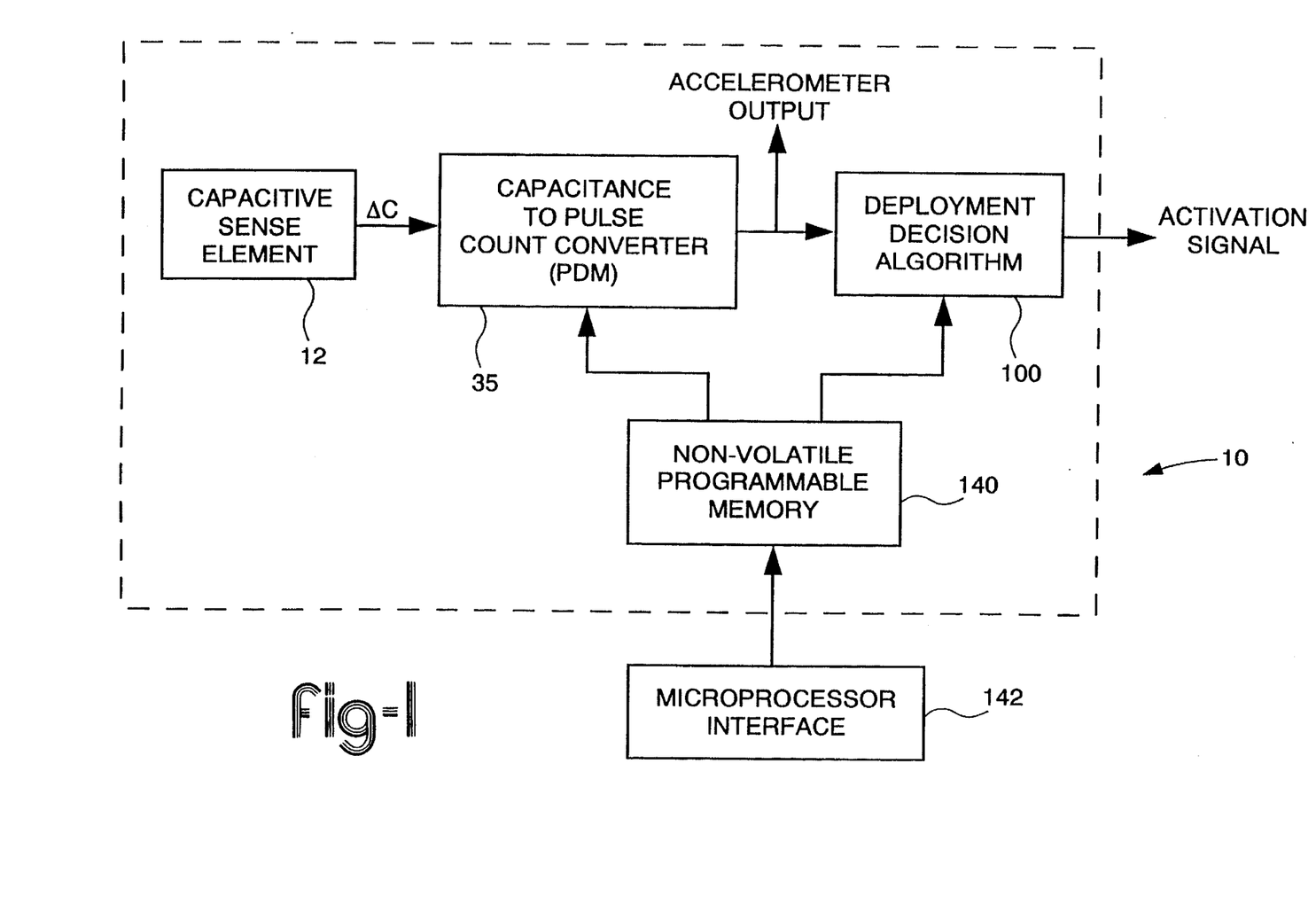
FIG. 1 is a block diagram of the impact sensor of the present invention.

FIG. 1 is a block diagram illustrating the preferred embodiment of the impact sensor 10. The first block, which is a capacitive sense element 12, is further illustrated in FIGS. 2, 3 and 4.

Figure 2:
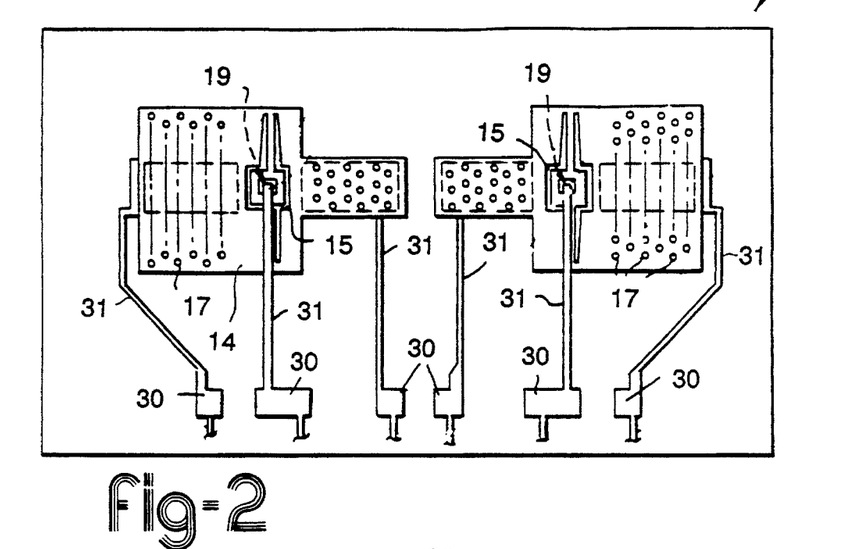
FIG. 2 is a plan view of a preferred embodiment of the sense element in the impact sensor of the present invention.
Figure 3:
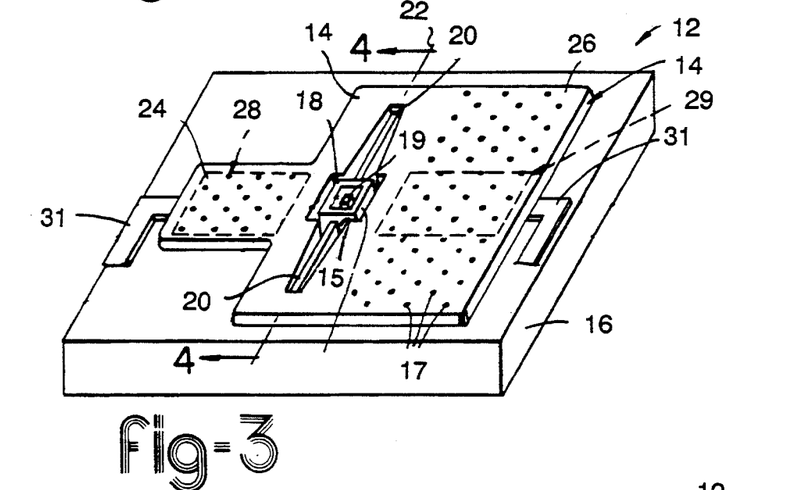
FIG. 3 is a plan view of one portion of the sense element of the present invention.
Figure 4:
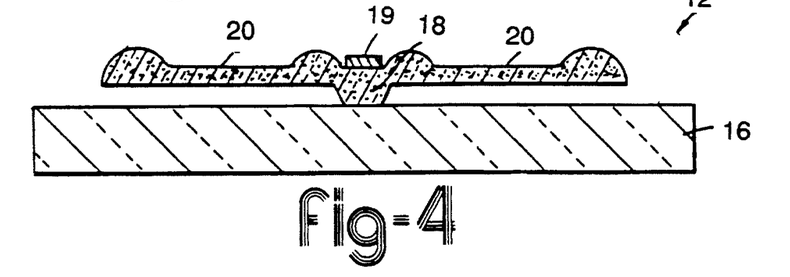
FIG. 4 is a cross-sectional view of the sense element of the present invention taken along line 4—4 in FIG. 3.

The sense element 12 has a deflectable upper plate 14 which is positioned above a substrate 16. Preferably, the sense element 12 comprises a substantially planar boron doped silicon deflectable upper plate 14 having a central opening 15 and a substantially planar dielectric substrate 16. Advantages such as freedom from plastic deformation and stresses induced by differential thermal expansions and contractions, increased strength and improved manufacturing efficiency and economy are achieved with the use of these materials in the sense element 12.

The upper plate 14 preferably has an acceleration response capability in the range of 0.5 to 1000 g, a measurement bandwidth from 0 to 5000 Hertz and a damping ratio from 2 to 20. These values can be adjusted by forming openings 17 in the upper plate 14, details of which will be explained later. Additionally, upper plate 14 has a length from 0.1 to 10 millimeters and a width of approximately 0.05 to 5.0 millimeters. Most preferably, upper plate 14 will have a length of approximately 1 millimeter and a width of approximately 0.5 millimeters.

The silicon of upper plate 14 will preferably have a boron concentration of $1 \times 10^{19}$ cm$^{-3}$ or greater. The use of boron doped silicon to form upper plate 14 eliminates potential problems such as hysteresis and creep as well as nondesirable plastic deformation resulting from high stress conditions and mechanical forces. Hysteresis is eliminated because a single-crystal silicon wafer with no grain boundaries is utilized for the formation of the boron doped silicon upper plate 14.

Substrate 16 is preferably a solid dielectric material such as glass, ceramic, nitride or plastic. Ideally, substrate 16 will be manufactured out of glass and will have a coefficient of thermal expansion similar to that of silicon. A suitable glass for use in substrate 16 is Corning Code #7740 which is available from Dow Corning, located in Corning, N.Y., U.S.A. Substrate 16 will preferably have a thickness between 0.2 to 1.5 millimeters and most preferably will be in the range of 0.5 to 0.8 microns (μ) thick. Using the boron doped silicon upper plate 14 and the dielectric substrate 16 in combination substantially reduces stresses which may occur in the use of materials with significantly different coefficients of thermal expansion.

The upper plate 14 and the substrate 16 are substantially parallel to one another in the absence of accelerations and gravitational forces normal to the planar surface of the sense element 12. The upper plate 14 is supported on the substrate 16 by a pedestal 18. Referring to FIG. 3, it can be seen that pedestal 18 is attached to the upper surface of substrate 16. Pedestal 18 is preferably anodically bonded to the substrate 16. A pedestal pad 19 is attached to the top of pedestal 18. Pedestal pad 19 is preferably aluminum, but any electrically conductive material can be used. Torsion arms 20 about central opening 15 define a flexure axis 22 about which the upper plate 14 tilts in response to an acceleration force normal to its surface. The smaller size of the pedestal 18 and torsion arms 20 which support the upper plate 14 provides a more torsionally sensitive sense element 12.

The flexure axis 22 divides the upper plate 14 into first and second movable portions 24 and 26. Semiconductive deflectable upper plate 14 will preferably have a shape such that first and second movable portions 24 and 26 will each have a total moment (i.e. mass times moment arm) about flexure axis 22 which is less than the total moment of upper plate 14. With this arrangement, acceleration which occurs normal to the plane of the sense element 12 will cause upper plate 14 to tilt about flexure axis 22. The degree of deflection will be approximately proportional to the magnitude of the acceleration. Additionally, the direction of the deflection of upper plate 14 will be a function of the direction of the acceleration.

Fixed conductive plates 28 and 29 are mounted on substrate 16 and are shown in phantom in FIGS. 2 and 3. While a variety of metals are suitable for the formation of fixed plates 28 and 29, a combination of metals will be preferably used. A suitable combination is chromium underlying platinum wherein chromium will have a thickness from 50 to 1000 Å and platinum will have a thickness from 50 to 3000 Å. Preferably, the chromium layer will be 150–300 Å thick and the platinum layer 500–1500 Å thick. Most preferably the chromium layer is 200°Å thick and the platinum layer 1000 Å thick. Those skilled in the art will appreciate that the total metal film thicknesses will range from between 100 Å to approximately 4000 Å. The fixed conductive plates 28 and 29 are preferably disposed on the substrate 16 symmetrically on either side of the flexure axis 22 so that the fixed plates 28 and 29 are located underneath first and second movable portions 24 and 26 of upper plate 14.

Bond pads 30 electrically connect the components of sense element 12 to the remainder of the impact sensor 10. More specifically, conductive leads 31 provide connections from the fixed plates 28, 29 and the pedestal pad 19 to the bond pads 30, which in turn are electrically connected to the next component of the impact sensor. The conductive leads 31 and bond pads 30 are made of an electrically conductive material, preferably aluminum. For clarity, the conductors have been omitted in FIGS. 2 and 3 to better illustrate other aspects of the claimed invention.

Figure 5:
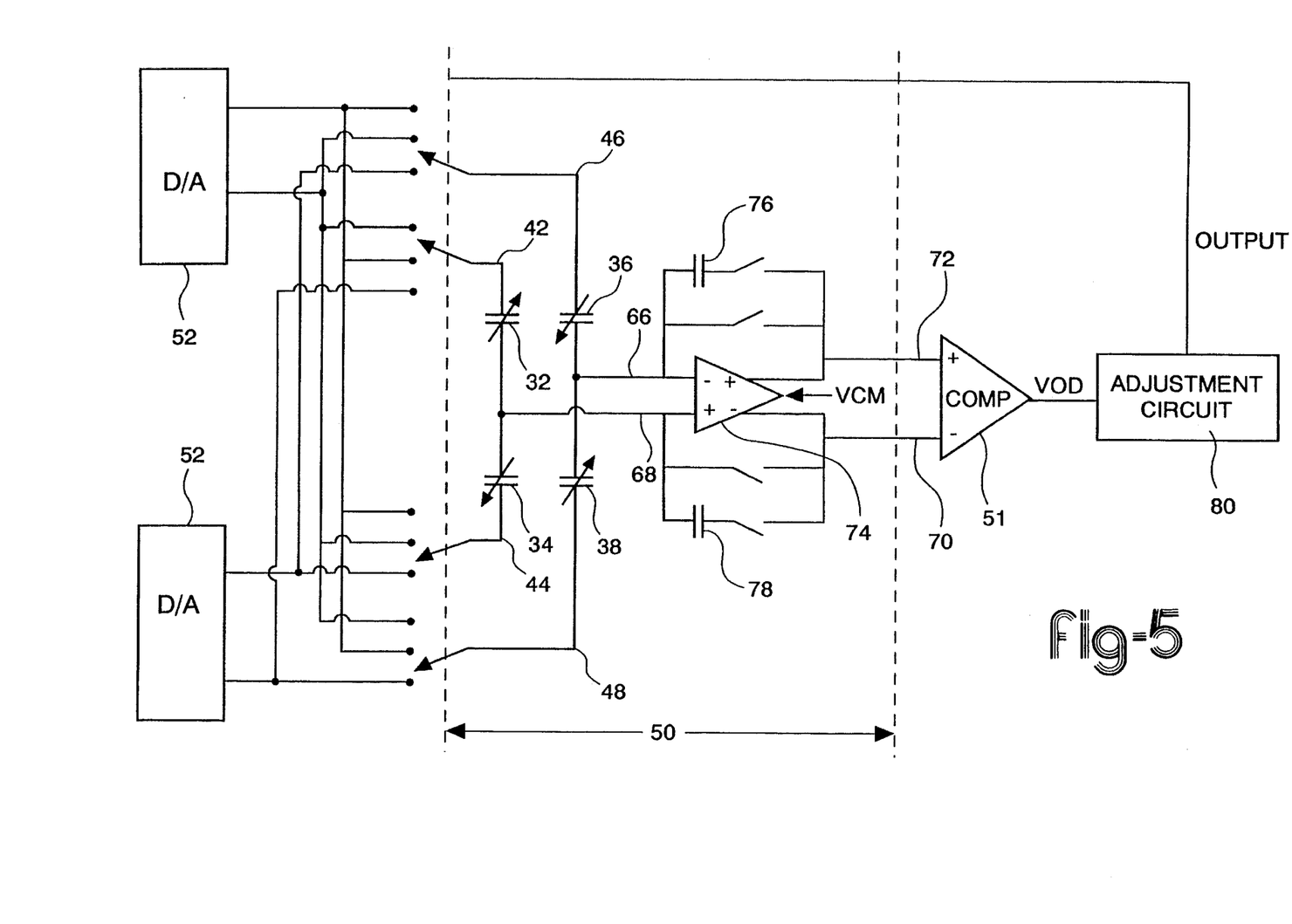
FIG. 5 is a schematic of the capacitance-to-pulse count converter of the present invention.

The first and second portions 24, 26 of the upper plate 14 correspond with fixed plates 28, 29 to form first and second variable capacitors 32 and 34, shown schematically in FIG. 5. By locating the capacitors 32, 34 created by the first and second portions 24, 26 of upper plate 14 and the fixed plates 28, 30 on opposite sides of the flexure axis 22, the tilting of the upper plate 14 varies the capacitance of both capacitors 32, 34 during acceleration. The deflection of the upper plate 14 and therefore the difference between the two capacitances 32, 34 is proportional to the acceleration force sensed by the sense element 12. Using two capacitors 32, 34 instead of a single one enables the sensor 10 to monitor variations in the difference between the two capacitors instead of monitoring an absolute capacitance value. This eliminates the need for a separate temperature compensation circuit since any variations in the capacitors due to temperature will affect both capacitors equally and not change the difference between the two capacitances. Additionally, the use of a fully differential sense element 12 of this type helps compensate for any manufacturing differences which may be present in the sense element 12 since no fixed reference point is used to measure the capacitance.

Since the sensitivity of sense element 12 corresponds to the mass of upper plate 14, it is advantageous in the invention for upper plate 14 to be as large as possible. The upper plate 14 is preferably placed between 1 and 10 microns above the substrate 16. However, air trapped between the plate 14 and the substrate 16 has a tendency to exhibit a higher viscosity than normal since the small space tends to restrict free air flow. As a result, the air mechanically damps the vibratory response of the sense element 12. In most cases, the sense element 12 at this point is too greatly overdamped and has a response which is slower than desirable.

To control the amount of damping in the sense element 12, openings 17 in the upper plate 14 are provided, as stated previously. The number and size of the openings 17 can be adjusted to modify the damping characteristics of the upper plate 14. Preferably, the plurality of openings 17 will extend through the first and second movable portions 24, 26 of the upper plate 14. Note that although FIG. 1 illustrates the plurality of openings 17 as individual circular holes, other shapes and configurations are possible. The openings 17 are preferably staggered on the upper plate 14 and have relatively small diameters on the order of 0.1 to 50μ. Openings of this small size are less likely to affect the capacitance of the capacitors 32, 34. Additionally, using a large number of smaller openings instead of a small number of large openings increases the degree of control of the damping characteristics in the sense element 12 during manufacture in order to achieve particular response characteristics.

During operation of the sense element, the openings 17 in the upper plate 14 has the effect of decreasing the overall damping ratio in the sense element and increasing the speed of response by allowing additional paths for air flow. Preferably, the upper plate 14 of the sense element 12 is mechanically damped so that it is responsive to oscillation frequencies between 0 and 500 Hertz. Optimally, the frequency range is between 0 and 275 Hertz. Mechanically limiting the frequency response of the sense element 12 in this manner eliminates the need for the circuitry to analyze the response of the sense element 12 over the entire frequency spectrum. Because the majority of noise signals are mechanically filtered by the sense element, there is no need to electrically filter extraneous noise at a later step.

As stated previously, the capacitive difference between the two capacitors 32, 34 changes with respect to the acceleration sensed by the sense element 12. The bond pads 30 provide electrical connection between the capacitors 32, 34 and a capacitance-to-pulse count converter circuit 35 which processes the capacitance values. A preferred embodiment of the capacitance-to-pulse count converter circuit 35 is shown in FIG. 5. The circuit 35 converts the varying capacitance difference in the sense element 12 into a digital pulse train signal. The pulse density of the pulse train is modulated according to variations in the capacitance through delta-sigma modulation.

In general, delta-sigma modulation involves taking an input signal and using it to drive an integrator whose output is compared with another signal by a comparator. Depending on the comparator output, pulses of fixed length are switched into a summer at each clock transition.

Preferably, two differential capacitive sense elements are used in the impact sensor, providing a total of four sense element capacitors. Referring to FIG. 5, the capacitors 32, 34 and additional capacitors 36, 38 are dependent on the acceleration normal to the impact sensor 10, as stated previously. The direction of the capacitance change during acceleration is indicated by the arrows on the capacitors 32 through 38.

During a change in the capacitance, the charge in the capacitors is maintained at a constant level by varying the voltages at nodes 42, 44, 46 and 48. This is more clearly illustrated in examining the equation $$C=qV$$

where C is the capacitance in a capacitor, q is the charge in the capacitor, and V is the voltage across it. To maintain a constant charge q with variations in C, V must be adjusted accordingly in order to keep the equation true. The closed loop charge rebalance configuration of the input stage 50 maintains the constant charge in capacitors 32, 34, 36 and 38 as the capacitance changes with acceleration.

Figure 6A:
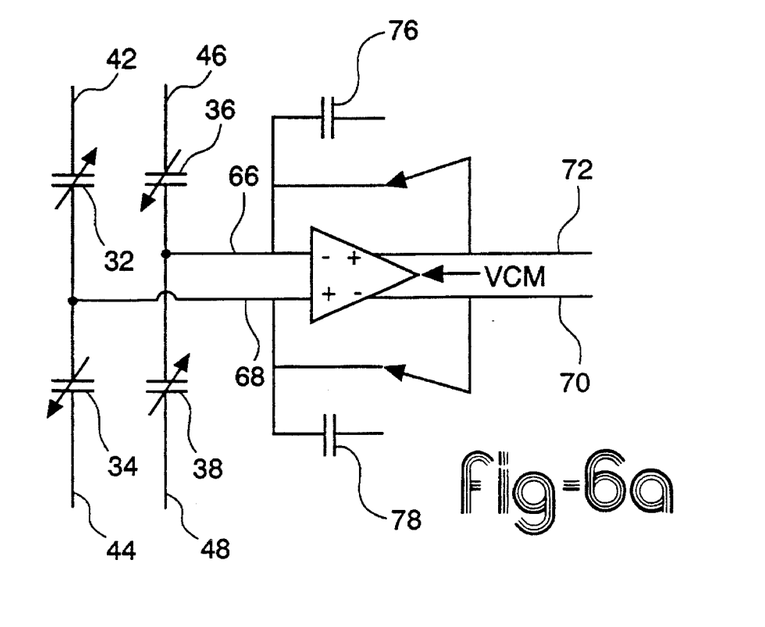
FIG. 6a is a schematic of the input stage of the capacitance-to-pulse count converter of the present invention during the unity phase.
Figure 6B:
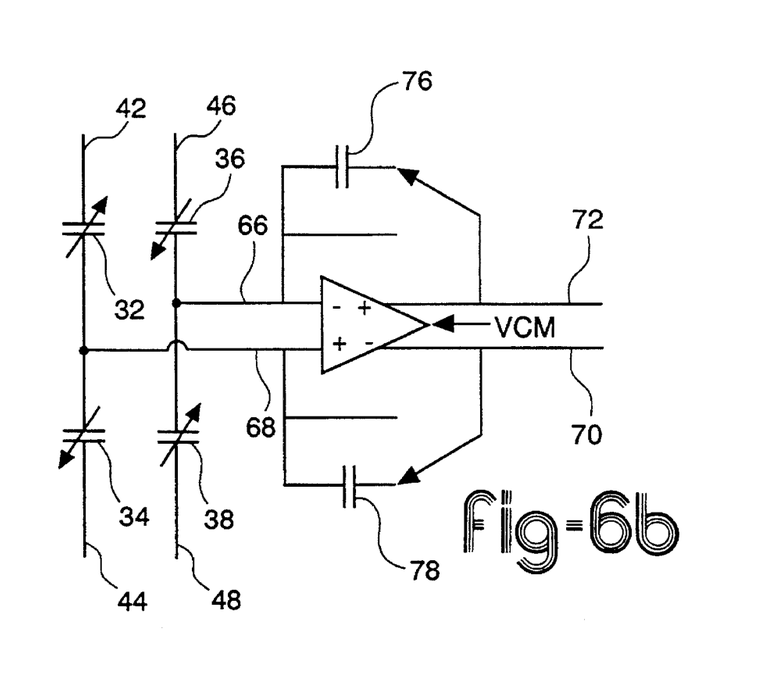
FIG. 6b is a schematic of the input stage in the capacitance-to-pulse count convertor of the present invention during the integration phase.

FIGS. 6a and 6b illustrate the operation of the input stage 50 of the capacitance-to-pulse count converter in more detail. The input stage 50 is continuously clocked between a unity phase shown in FIG. 6a and an integration phase shown in FIG. 6b. The voltages at nodes 42, 44, 46 and 48 are applied by digital-to-analog converters 52 and 54 and depend on the clock phase and the sign of the output voltage (VOD) from comparator 51 at the end of the previous integration phase.

During the unity phase shown in FIG. 6a, common mode voltage VCM is established at negative input terminal 66, positive input terminal 68, negative output terminal 70 and positive output terminal 72 of operational amplifier (op amp) 74. The closed loop charge rebalance configuration maintains the op amp 74 at a constant operating point. Output voltage VOD from comparator 51 is the difference between the voltages at positive output terminal 72 and negative input terminal 70. A voltage predetermined by the digital-to-analog converters 52 and 54 is applied to nodes 42, 44, 46 and 48 and the entire circuit 35 is allowed to settle to a static condition.

During the integration phase shown in FIG. 6b, integrating capacitors 76 and 78 are connected with the op amp 74. Voltages at nodes 42, 44, 46 and 48 are adjusted to keep the charges in capacitors 32 through 38 constant. The charges in the integrating capacitors 76 and 78 are also changed based on the amount in the values of the capacitors 32, 34, 36 and 38 and the amount of change which occurred in the voltages at nodes 42, 44, 46 and 48 between the unity and integration phases. The total charge in integrating capacitors 76 and 78 is the sum of the charge accumulated prior to a given cycle plus the charge accumulated during that cycle. The change in VOD during each integration cycle is proportional to the charge contributed during that cycle. During both the unity phase and the integration phase, the common mode voltage VCM and output voltage VOD are kept equal.

Output voltage VOD is then fed to adjustment circuit 80 which analyzes VOD and generates the pulse density modulated digital pulse train signal. Ideally, the number of pulses per unit time is linearly proportional to the acceleration senses by the impact sensor 10. Prior to adjustment, the number of pulses in the pulse train at zero G's (indicating zero acceleration) is equal to an offset value which is slightly different for each sensor 10 due to aspects such as manufacturing tolerances and component variations. The number of pulses in the pulse train at this stage is greater than the offset value if the sensor 10 is experiencing a positive G-force and less than the offset value if the sensor 10 is experiencing a negative G-force, with optimally zero pulses per unit time at a full scale negative G-force. Since analyzing the pulse train would be greatly simplified if zero G's and zero acceleration were equated with zero pulses per unit time, the adjustment circuit 80 modifies the pulse train by an amount equal to the offset to make this provision true.

Figure 6C:
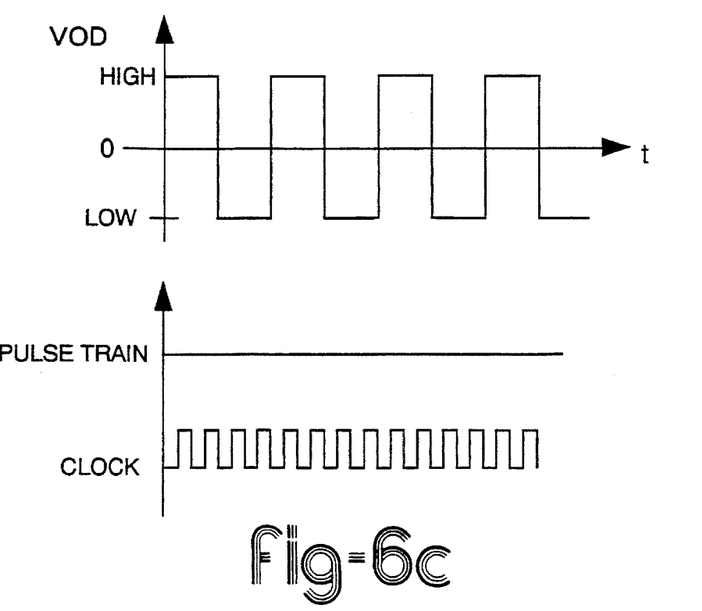
FIGS. 6c and 6d are waveforms illustrating the output of the capacitance-to-pulse count converter of the present invention.
Figure 6D:
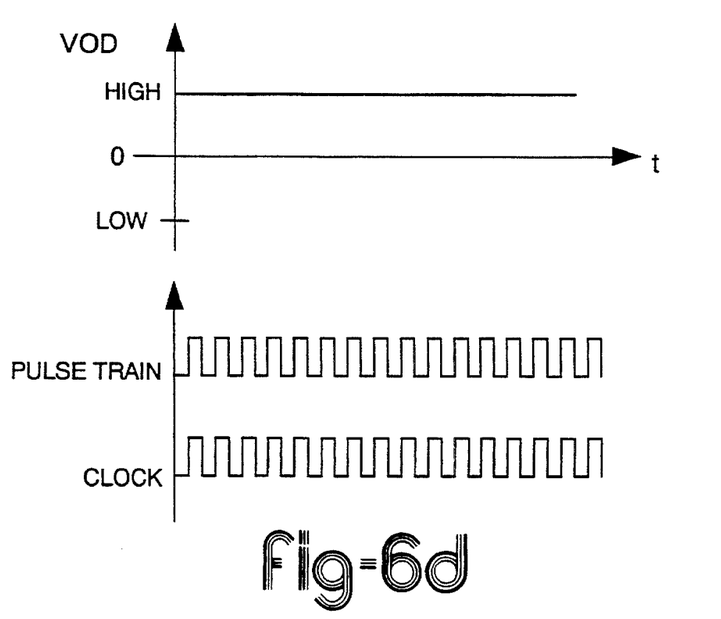

Referring to FIG. 6c and 6d, the pulse density is modulated by observing the number of times VOD is adjusted high or low, comparing the amount of difference between number of highs and the number of lows, and adjusting the pulse density of the pulse train based on that difference. FIG. 6c, for example, shows VOD and the pulse train at zero acceleration. Since the number of highs in VOD is equal to the number of lows, the difference between the number of highs and lows is zero and therefore the number of pulses in the pulse train is equal to the preselected offset value, indicating that no acceleration is present. Preferably, the pulse train is virtually flat at zero acceleration.

In FIG. 6d, however, at full scale acceleration, the difference between the numbers of highs and lows in VOD is equal to the total number of highs and therefore the pulse density of the pulse train is set equal to a clock pulse density. Accelerations which are between zero and full scale generate pulse densities which are linearly proportional between these two extremes.

Figure 7:
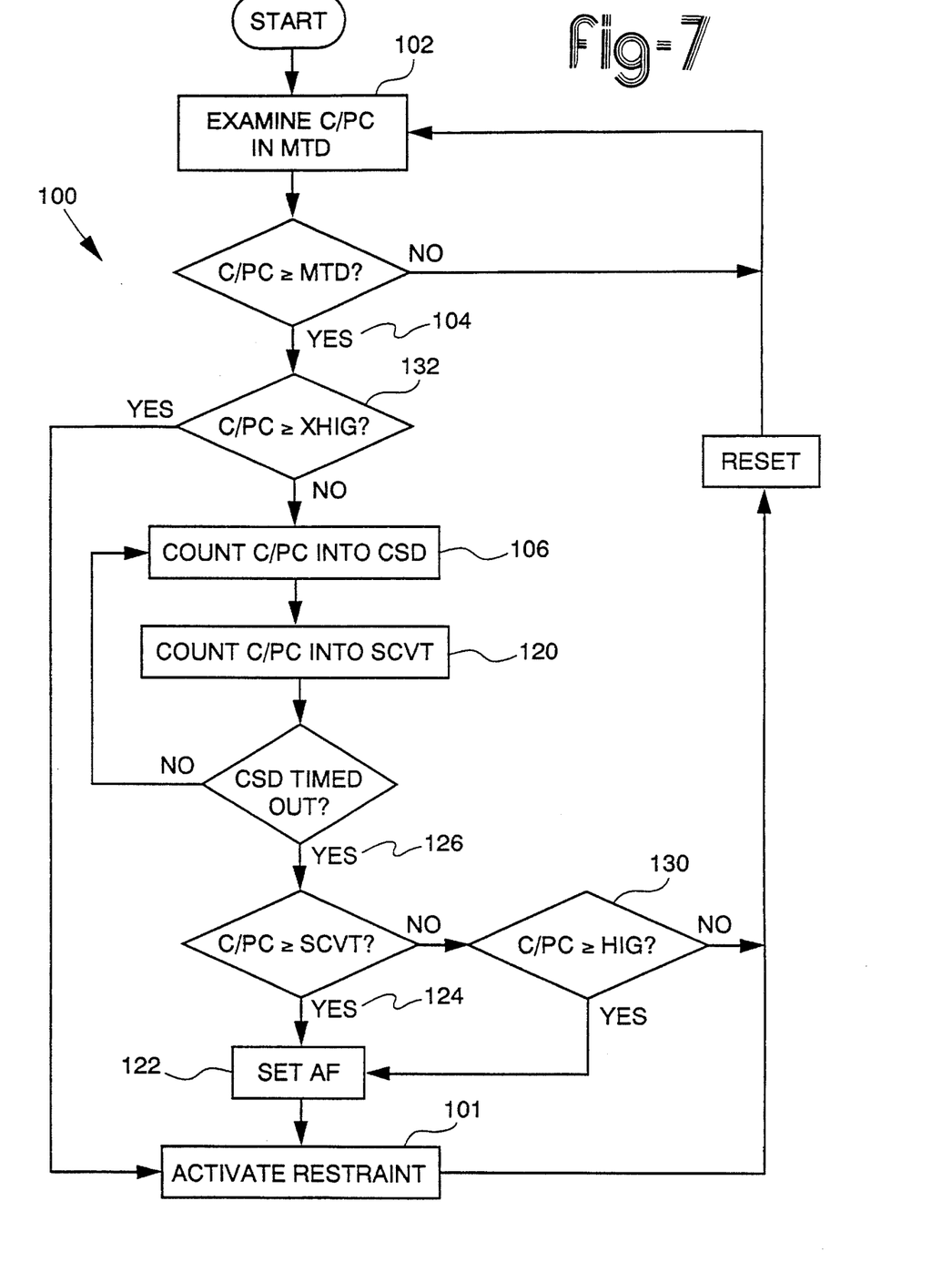
FIG. 7 is a flowchart illustrating the impact sensor deployment decision circuit and deployment algorithm of the present invention.

The pulse density of the digital signal is continuously monitored by a deployment decision circuit 100 illustrated in FIG. 7. The output of the deployment decision circuit 100 is a single pulse which activates a passenger restraint. The circuit 100 first has a moving threshold detector (MTD) 102 which constantly examines the output of the capacitance-to-pulse count converter 35. The output from the adjustment circuit 80 contains information which is relative to the integral of the sense element capacitance difference. The capacitance difference is sampled at a rate which is preferably about 1000 times faster than the rate of response of the capacitors 32, 34, 36 and 38. This over-sampling technique ensures that any capacitive variations will be detected by the sensor 10.

The MTD 102 has a moving time window and a predetermined pulse count threshold. By sampling the output signal over a specified time period, the information contained in the window is representative of the average acceleration level indicated by the signal. If the number of pulses in the digital signal exceeds this preprogrammed threshold 104, the signal is indicative of an acceleration event which exceeds a certain acceleration level. At this point, the threshold detector will trigger an MTD flag and initiate the deployment algorithm, beginning at block 106, to decide whether the deceleration event requires the deployment of the passenger restraint.

The deployment algorithm first uses a impact severity detector (CSD) to analyze the digital signal 106. This is a stationary discriminator which determines the severity of a impact during the first few milliseconds after the MTD flag has been set. The starting point of the CSD is established by the triggering of the MTD flag and the ending point is established with a preprogrammed value. This time value is monitored by a CSD timer.

The sustained impact velocity threshold (SCVT) 120 is another stationary discriminator which works with the CSD by determining if the vehicle has sustained a significant change in velocity. If the contents of the SCVT 120 meets or exceeds a programmed threshold during the first few milliseconds after the MTD flag is set, an activation flag (AF) 122 will be set to indicate that the event is activation worthy. The contents of the SCVT 120 must be met or exceeded before the CSD timer expires 156. If the programmed CSD time expires and the contents of the SCVT has not met or exceeded the programmed threshold, the activation flag AF 122 will not be set. This velocity threshold ensures that the vehicle is subjected to an event which is capable of setting the activation flag 122 and severe enough to cause the vehicle to experience some significant change in velocity. As stated previously, the contents of the SCVT 120 must be met or exceeded prior to the expiration of time in the CSD 126. The SCVT and CSD can be implemented by a single counter. The use of both the SCVT and CSD counters ensures that the activation flag 122 was not set erroneously.

In addition to the various counters, two extra detectors are used to detect unusually high G-forces caused by severe deceleration in the vehicle. A high G-force detector (HIG) 130 can set the activation flag 122 when the contents of the MTD meet or exceed a predetermined high G threshold 104. The activation flag 122 can only be set by the high G-force detector 130 if the SCVT 120 threshold has not been met or exceeded. An extra high G-force detector (XHIG) 132 can also be provided prior to setting the CSD timer to set the activation flag AF 122 if the contents of the MTD 102 meet or exceed an extra high G threshold. In this case, the activation flag 122 will be set regardless of the state of the SCVT or the CSD.

In a preferred embodiment, a non-volatile programmable memory 140 is used to store deployment decision circuit parameters as well as values programmed through a microprocessor interface 142 during accelerometer calibration. The memory 140 can also be used to store vehicle-specific values such as serial numbers. Calibration of the accelerometer is preferably conducted while the impact sensor 10 is actually under some type of force. This can be accomplished in a machine such as a centrifuge or a shaker.

The impact sensor 10 of the invention is designed so that it uses only about 2 mA of current during operation. Since the amount of energy needed to power the sensor 10 is minimal, it is possible to enable the sensor 10 to continuously monitor acceleration and detect high impact conditions while the vehicle is off without excessively draining the car battery. Activation of the passenger restraint can occur even if the car is parked and turned off. A separate reserve power supply may also be used to continuously power the impact sensor when the vehicle is off.

While the best mode for carrying out the invention has been described in detail, those familiar with the art to which this invention relates will recognize various alternative designs and embodiments for practicing the invention as defined by the following claims.

What is claimed is:

1. An impact sensing device for controlling the activation of a vehicle passenger restraint mechanism, the device comprising:

a capacitive sense element having a first capacitor and a second capacitor, a difference between the first and second capacitors being variable in capacitance wherein the difference is a function of the acceleration of the vehicle;

means for generating a difference signal based upon the difference between the first and second capacitances;

means for generating a pulse density modulated acceleration signal wherein the pulse density of the acceleration signal is proportional to the amplitude of the difference signal, the pulse density of the acceleration signal being proportional to a clock pulse density;

means for monitoring the pulse density of the acceleration signal, the monitoring means setting a first flag if the acceleration signal pulse density exceeds a predetermined threshold;

means for measuring the number of pulses in the acceleration signal within a given time interval after the first flag is set, the measuring means setting an activation flag if the number of pulses exceeds a predetermined number, indicating the activation worthy event;

means for confirming that the activation flag was not set erroneously; and means for activating the passenger restraint mechanism when the activation flag is confirmed by said confirming means.

2. The impact sensing device of claim 1 further comprising a non-volatile memory in communication with the monitoring means for storing vehicle-specific parameters.

3. The impact sensing device of claim 2 wherein the non-volatile memory is used to store calibration values.

4. The impact sensing device of claim 1 further comprising a reserve power supply having sufficient energy to power the impact sensing device when the vehicle is turned off.

5. The impact sensing device of claim 1 wherein the capacitive sense element has a substantially planar upper plate which is disposed above a substantially planar substrate, the upper plate being tiltable about a flexure axis which defines a first portion and a second portion of the capacitive sense element, the first capacitor disposed on the first portion and the second capacitor disposed on the second portion wherein the tilting of the upper plate due to acceleration of the vehicle creates the difference between the first and second capacitances.

6. A method for controlling an impact sensing device which controls the activation of an vehicle passenger restraint mechanism, the method comprising the steps of:

generating a capacitive difference in a capacitive sense element in the impact sensor, the capacitive difference having a value which is a function of the vehicle acceleration;

generating a difference signal as a function of the capacitive difference;

generating a pulse density modulated acceleration signal wherein the pulse density of the acceleration signal is proportional to the amplitude of the difference signal, the pulse density of the acceleration signal being proportional to a clock pulse density wherein the pulse densities of the acceleration signal and the clock are equal at full scale acceleration;

monitoring the pulse density of the acceleration signal and setting a first flag if the acceleration signal pulse density exceeds a predetermined threshold;

measuring the number of pulses in the acceleration signal within a given time interval after the first flag is set and setting an activation flag if the number of pulses exceeds a predetermined number;

confirming that the activation flag was not set erroneously; and activating the passenger restraint mechanism when the activation flag is set and confirmed.

7. The method of claim 6 further comprising the step of storing vehicle-specific parameters and calibration values which affect the predetermined threshold in the monitoring step and the predetermined number in the measuring step in a programmable memory on the impact sensing device.

* * * * *